July 7, 1970 M. B. KNIGHT 3,519,741

REGULATED HIGH VOLTAGE POWER SUPPLY

Filed June 12, 1967

INVENTOR

MARK BERWYN KNIGHT

BY William H. Meagher

Attorney

United States Patent Office 3,519,741

Patented July 7, 1970

3,519,741

REGULATED HIGH VOLTAGE POWER SUPPLY

Mark Berwyn Knight, North Caldwell, N.J., assignor to RCA Corporation, a corporation of Delaware Filed June 12, 1967, Ser. No. 645,257
Int. Cl. H04n 3/18
U.S. Cl. 178—7.5 6 Claims

ABSTRACT OF THE DISCLOSURE

A horizontal deflection system and regulated high voltage supply for a color television receiver employing semiconductor devices. The regulator system provides controllable loading of the flyback pulse. The controllable pulse load comprises a charging rectifier, a filter capacitor and a discharging transistor coupled across the capacitor. Conduction of the transistor is controlled according to the amplitude of flyback pulses applied to the high voltage rectifier.

DESCRIPTION

Figures 1, 2A, 2B, 2C:
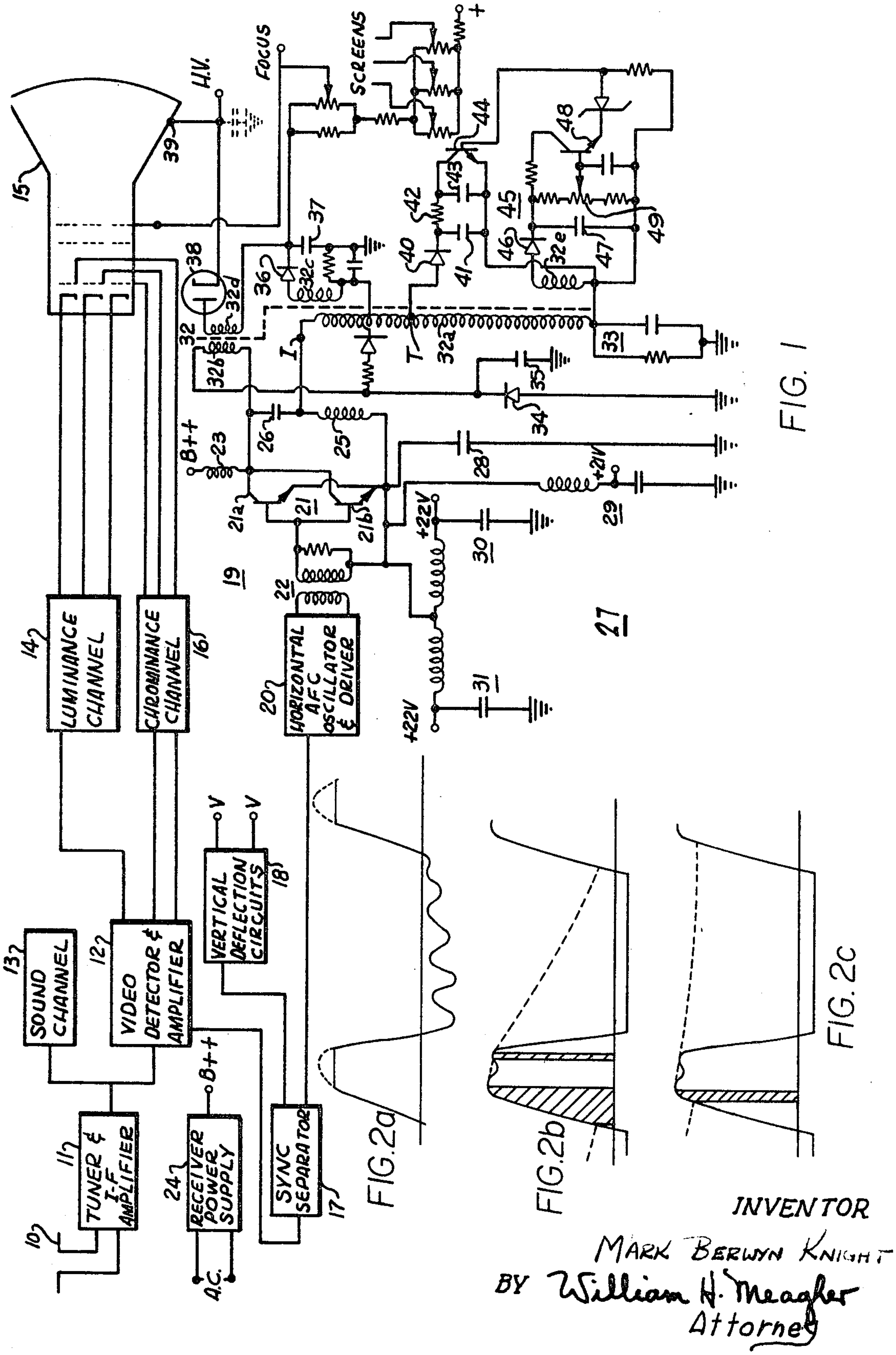

This invention relates to regulated power supplies, and in particular, to a regulating system suitable for use in connection with a flyback pulse type of high voltage power supply in a color television receiver.

In color television receivers employing shadow mask color kinescopes, it is important that the high voltage supplied to the final accelerating electrode remain substantially constant despite wide variations in kinescope load (beam current) under varying signal conditions and customer control (e.g. brightness) adjustments. One approach to the regulation problem involves the use of a shunt regulator tube having its space current path disposed directly across the kinescope load (i.e. between the high voltage rectifier and ground potential). As kinescope load variations tend to alter the output of the high voltage rectifier, the alterations are sensed and applied to a control electrode of the shunt regulator to introduce a compensating variation in the load presented by the regulator such that the combination of the regulator and kinescope present a substantially constant load on the high voltage supply.

An alternative regulating system utilizing an electron tube may be designated as a "pulse" regulator. In this latter system, the regulating device is shunted across a segment of the primary winding of the flyback transformer and acts as a variable load on the flyback pulse source which supplies the high voltage rectifier. The control effect is therefore associated with the input to the high voltage system rather than with its output. The regulating device is therefore associated with voltages of a much lower level than that produced at the output of the high voltage rectifier and some economies may be realized.

While the regulator arrangements generally described above are capable of quite effective regulation, they are not directly applicable to a receiver employing solid state (e.g. transistor) devices. In the first instance, during the warm-up time of the shunt regulator tube, the high voltage may rise to an undesirably high level since the remaining circuits (transistorized) normally would commence operating almost instantaneously. In the second instance, while it is conceivable that a transistor may be employed directly as a variable pulse loading device, since large peak load currents are demanded of the loading device at the time when voltage applied to the loading device is near its highest value (during the flyback pulse), a relatively costly device would be required (i.e. high second-breakdown requirements).

The present invention is directed to a regulating arrangement which provides satisfactory performance while using relatively inexpensive devices and, in particular, while using transistors and other semiconductor devices. The advantages of the present invention are particularly significant in a transistorized television receiver.

In accordance with an embodiment of the present invention, a high voltage regulating system for a color television receiver comprises a variable load coupled across a portion of the primary winding of a horizontal deflection output transformer (i.e. the flyback pulse source). The variable load comprises a charging rectifier coupled in series with a capacitor and a controllable discharging transistor coupled across the capacitor. Conduction in the transistor is controlled in response to variations in the amplitude of high voltage pulses applied to the high voltage rectifier so as to maintain such high voltage substantially constant as the load thereon varies.

A primary object of the present invention is to provide a relatively economical, relatively low voltage regulating arrangement for the high voltage supply of a color television receiver, such a regulating arrangement utilizing semiconductor devices.

The novel features that are considered characteristic of this invention are set forth with particularity in the appended claims. The invention itself, however, both as to its organization and method of operation as well as additional objects thereof will best be understood from the following description when read in connection with the accompanying drawings in which:

FIG. 1 illustrates a color television receiver employing a high voltage regulation system embodying the present invention, the receiver being shown partially in block form, but with pertinent portions of the deflection and high voltage systems shown schematically;

FIGS. 2*a*, 2*b*, and 2*c* illustrate a series of waveform diagrams which are utilized in the explanation of the operation of the system shown in FIG. 1.

Referring to FIG. 1, a carrier wave modulated by a composite television signal including luminance, chrominance, sound, deflection, synchronizing components and color synchronizing bursts is intercepted by an antenna 10 and is applied to a tuner and I-F amplifier section 11 which includes radio frequency amplification stages, a converter or first detector wherein the modulated carrier wave is translated to an intermediate frequency and an intermediate frequency amplifier. Amplified I-F signals are applied to a second or video detector 12. The amplified sound component is separately applied to a sound channel 13 for detection, amplification and ultimate reproduction in a loudspeaker.

The composite television signal which is recovered by video detector 12 is amplified by subsequent appropriate video stages. Various components of the amplified detected signal are applied to several signal processing channels of the receiver in the following manner. The luminance signal component of the composite television signal is applied to a luminance channel 14 for amplification and subsequent application to the cathodes of a color television kinescope 15. The chrominance and color synchronizing burst components are supplied to a chrominance channel 16 for development of color difference signals (R–Y, B–Y, G–Y). The color difference signals are applied to respective control grids of kinescope 15.

Deflection synchronizing components are supplied to a synchronizing signal separating circuit 17, respective vertical and horizontal synchronizing outputs of which are applied to a vertical deflection circuit 18 and a horizontal deflection circuit 19. Horizontal deflection circuit 19 comprises means for generating scanning waves at television line frequencies for application to an electromagnetic deflection yoke. Deflection circuit 19 also serves to produce various high and low direct voltages for energizing additional portions of the receiver, including the kinescope 15 as will be explained more fully below.

Specially, horizontal synchronizing pulses are supplied from sync separator 17 to a circuit block 20 labelled "Horizontal AFC, Oscillator and Driver." Circuit block 20 is arranged in a conventional manner to provide a driving waveform to a horizontal output stage 21 via a coupling transformer 22. The driving waveform, in accordance with conventional reaction scanning and power recovery techniques, renders output stage 21 conductive throughout at least the second half of each horizontal line scanning interval and renders stage 21 non-conductive at the end of each horizontal line (e.g. at a rate of 15,734 cycles per second).

Output stage 21 is shown as including a pair of NPN transistors 21*a* and 21*b* connected in parallel. For purposes of the following discussion, the parallel connected transistors 21*a* and 21*b* may be considered as a single unit. Output stage 21 is provided with a direct operating voltage by means of an inductor 23 coupled between the main B++ terminal of a receiver power supply 24 and the connected collector electrodes of transistors 21*a* and 21*b*.

A horizontal deflection winding 25 associated with kinescope 15 in a conventional manner is coupled across (i.e. between collector and emitter electrodes) of output stage 21 by means of a D-C blocking and "S"-shaping capacitor 26.

A secondary direct voltage supply indicated generally by the reference numeral 27 is developed between the emitter electrodes of output stage 21 and a reference voltage point (e..g ground). The secondary voltage supply 27 comprises a relatively large storage capacitor 28 and a plurality of inductance-capacitance filters 29, 30 and 31 for providing selected direct operating voltages of lower amplitude than the main B++ supply, such voltages being used to supply remaining portions of the receiver (e.g. sound channel 13, deflection circuit 18, luminance channel 14, etc.).

A multiple winding horizontal output of flyback transformer 32 is coupled to output stage 21. Specifically, an input terminal I of a primary winding 32*a* of transformer 32 is coupled to the junction of capacitor 26 and horizontal deflection winding 25. The opposite end of primary winding 32*a* is coupled to a parallel circuit arrangement 33 of a resistor and a capacitor which is, in turn, returned to ground. A direct voltage is developed across parallel circuit 33 to provide a centering effect on the deflection current supplied to deflection winding 25. A damper diode 34 is coupled by means of a further winding 32*b* and capacitor 26 between ground and input terminal I of transformer 32. A retrace capacitor 35 is coupled across damper diode 34.

A secondary winding 32*c* provides retrace pulses for developing a focus supply voltage, the focus supply voltage being produced by means of a focus rectifier 36 and a focus filter capacitor 37 coupled in series across winding 32*c*. A high voltage winding 32*d* having one end "stacked" on the focus supply capacitor 37 and the other end coupled to a high voltage rectifier 38 provides retrace pulses for developing a high voltage (e.g. 25,000 volts) for application to a final accelerating anode 39 of kinescope 15.

In accordance with the present invention, a high voltage regulating arrangement associated with transformer 32 is provided.

Means for providing a variable load on the flyback pulse source (i.e. on transformer 32) are coupled to a tap T on primary winding 32*a*. A rectifier 40 poled to conduct during retrace (flyback) pulses is coupled in series with a capacitor 41 across that portion of winding 32*a* between tap T and its lowermost (low voltage) end. A limiting resistor 42 and a filter capacitor 43 are coupled in series across capacitor 41. A controllable transistor 44 having its output terminals (collector and emitter electrodes) coupled across capacitor 43 controllably discharges capacitor 41 as will be explained more fully below.

Flyback pulse amplitude sensing means 45 are coupled to the input (base-emitter) electrodes of transistor 44 to control conduction therein. Sensing means 45 comprises a winding 32*e* arranged on transformer 32 to provide pulses having an amplitude proportional to but substantially less than the flyback pulses developed across winding 32*d*. A rectifier 46 and a filter capacitor 47 are coupled across winding 32*e* to develop a direct voltage representative of the flyback pulse amplitude. A portion of the last-named direct voltage is supplied to a direct coupled amplifier 48 for amplification prior to application to transistor 44. Use of amplifier 48 is optional depending upon the amplification characteristics of transistor 44 and additional circuit elements. Variable resistor 49 may be utilized for high voltage adjustment.

In operation, the circuit elements 40, 41, 42, 43, 44 serve as a controllable variable load on the flyback pulse source (transformer 32).

For a high brightness level signal condition, the kinescope load on the high voltage supply will be a maximum and under such conditions, minimum loading by the regulator arrangement is desired. Referring to FIG. 2*c*, the voltage waveform is shown which appears at tap T of primary winding 32*a* and is supplied to the combination of rectifier 40 and capacitor 41. The dashed line is representative of the voltage across capacitor 41. Capacitor 41 charges during the interval shown by diagonal lines, thereby loading the flyback pulse, and discharges through transistor 44 during the remainder of each cycle. The duration of the charging interval determines the degree to which the regulator arrangement loads the flyback pulse source. The conduction condition (output current level) of transistor 44 and therefore the discharge rate of capacitor 41 is controlled by sensing means 45. Transistor 44 is arranged for conduction substantially at all times. However, it should be noted that energy is extracted from the flyback pulse preferably only during the initial portion thereof in order to control high voltage without varying deflection energy. In sensing means 45, pulses (FIG. 2*a*) proportional to those supplied to high voltage rectifier 38 are supplied to the combination of rectifier 46 and capacitor 47. As shown by the solid line waveform in FIG. 2*a*, for high brightness level signals, the peak of the pulse is relatively flat. As brightness level decreases the high voltage pulse waveform tends to approach the dashed line (i.e. peak amplitude increases) and high voltage would tend to increase. The pulse waveform supplied via winding 32*e* and the resultant direct voltage produced across capacitor 47 are therefore indicative of high voltage. The direct voltage produced across capacitor 47 is amplified by means of direct coupled amplifier 48 and the output of amplifier 48 is applied to transistor 44 to control the output current therein.

For low brightness signal levels, loading of the kinescope 15 on the high voltage supply decreases. Therefore, to maintain high voltage constant, as the pulse waveform (FIG. 2*a*) tends to increase, transistor 44 is driven to a higher output current level, thereby discharging capacitor 41 more rapidly (see FIG. 2*b*). The flyback pulse source is therefore more heavily loaded by the regulator arrangement since rectifier 40 conducts over a substantially longer interval. It is desirable to select circuit parameters to avoid conduction of rectifier 40 during the latter half of the flyback pulse (not FIG. 2*b*) because such conduction affects the energy supplied to deflection winding 26 but does not substantially affect the high voltage pulses of winding 32*d* or the pulses of winding 32*e*.

It should be noted that resistor 42 and capacitor 43 are provided to reduce and filter the voltage applied to the collector electrode of transistor 44. Resistor 42 also serves to dissipate some of the energy removed from capacitor 41.

The value of capacitor 41 is selected sufficiently small so that the energy withdrawn during discharge reduces the voltage to an extent that, in combination with rectifier 40, it provides the desirable characteristic of recharging during the initial half of each flyback pulse. It should also be noted that transistor 44 is arranged to be continuously conducting at relatively low current levels.

What is claimed is:

1. In a television receiver including a kinescope having an accelerating electrode energized by a high voltage, said kinescope in operation drawing varying beam current from said electrode, a beam deflection winding for causing periodic line scanning of said kinescope, and a source of line scanning waves for energizing said beam deflection winding, the combination comprising means including a transformer having a first transformer winding coupled to said line scanning wave source, said means developing flyback voltage pulses across said first transformer winding during recurring retrace intervals of said line scanning waves, means including a second transformer winding coupled to said first transformer winding and a rectifier for developing from applied high voltage pulses said high voltage for said accelerating electrode, variable loading means coupled to said first transformer winding for providing a variable load for said flyback voltage pulses, said loading means comprising the series combination of a first rectifier and a first capacitor coupled across at least a portion of said first transformer winding, and a discharging transistor coupled across said first capacitor, and flyback pulse sensing means coupled to said transformer and to said discharging transistor for controlling conduction of said transistor so as maintain said high voltage substantially constant despite variations in said beam current.

2. Apparatus in accordance with claim 1 wherein said first capacitor is selected of sufficiently small value to substantially confine conduction of said first rectifier to the initial half of said flyback voltage pulses.

3. Apparatus in accordance with claim 2 wherein said pulse sensing means comprises a third transformer winding for developing pulses proportional to said high voltage pulses, a second rectifier and a second capacitor coupled in series relation across said third winding and means for coupling the junction of said second rectifier and second capacitor to said discharging transistor.

4. Apparatus in accordance with claim 3 wherein said discharging transistor comprises collector, emitter and base electrodes, said collector and emitter electrodes being coupled respectively to opposite ends of said first capacitor and said base and emitter electrodes being coupled to opposite ends of said second capacitor.

5. Apparatus according to claim 4 and further comprising the series combination of a limiting resistor and a filter capacitor coupled across said first capacitor and means connecting said collector and emitter electrodes to opposite ends of said filter capacitor.

6. In a television receiver including a line scanning and high voltage generating system and kinescope having an accelerating electrode energized by said high voltage system, high voltage regulating apparatus comprising:

a source of flyback voltage pulses, a controllable load coupled to said source comprising a charging rectifier, a capacitor, and a controllable discharging transistor coupled across said capacitor, and sensing means responsive to said flyback voltage pulses coupled to said high voltage generating system and to said controllable discharging transistor for varying the conduction of said transistor and thereby varying the load on said source of flyback pulses to maintain said high voltage substantially constant.

References Cited

UNITED STATES PATENTS 3,217,101 11/1965 Mattingly ........... 178—7.3

ROBERT L. GRIFFIN, Primary Examiner

R. L. RICHARDSON, Assistant Examiner

U.S. Cl. X.R.

315—27; 323—22

Disclaimer 3,519,741.—*Mark Berwyn Knight*, North Caldwell, N.J., REGULATED HIGH VOLTAGE POWER SUPPLY. Patent dated July 7, 1970. Disclaimer filed Oct. 8, 1970, by the assignee, *RCA Corporation*.

Hereby enters this disclaimer to claims 1–6 of said patent.

[*Official Gazette March 2, 1971.*]